United States Patent [19]

Babitzka et al.

[11] Patent Number: 4,967,966

[45] Date of Patent: Nov. 6, 1990

[54] ELECTROMAGNETICALLY ACTUATABLE VALVE

[75] Inventors: Rudolf Babitzka, Kirchberg-Neuhof; Ferdinand Reiter, Markgroeningen; Max Greiner, Gerlingen, all of Fed. Rep. of Germany

[73] Assignee: Robert Bosch GmbH, Stuttgart, Fed. Rep. of Germany

[21] Appl. No.: 354,566

[22] Filed: May 22, 1989

[30] Foreign Application Priority Data

Jul. 23, 1988 [DE] Fed. Rep. of Germany ....... 3825135

[51] Int. Cl.[5] ....................... F16K 31/02; F02M 51/06; H01F 7/16

[52] U.S. Cl. ................................ 239/585; 251/129.15

[58] Field of Search ................... 239/585; 251/129.15, 251/129.21

[56] References Cited

U.S. PATENT DOCUMENTS 3,082,359 3/1963 Mangiafico et al. ........... 251/129.15
3,757,263 9/1973 Saarem et al. ................. 251/129.15
4,483,485 11/1984 Kamiya et al. ...................... 239/585
4,564,145 1/1986 Takada et al. ...................... 239/585
4,610,080 9/1986 Hensley .............................. 239/585
4,651,931 3/1987 Hans et al. .......................... 239/585

FOREIGN PATENT DOCUMENTS 1055490 1/1967 United Kingdom ........... 251/129.15

*Primary Examiner*—Andres Kashnikow
*Assistant Examiner*—Karen B. Merritt
*Attorney, Agent, or Firm*—Edwin E. Greigg

[57] ABSTRACT

An electromagnetically actuatable valve having a connection fitting serving as a core and on which a magnet coil is disposed, is produced with a non-bulky valve housing of ferromagnetic metal. This valve housing is simple to manufacture with a reduced external valve size. The valve is provided with a plastic sheathing that surrounds not only a connection fitting but also a magnet coil and at least in the region surrounding the magnet coil includes a ferromagnetic element that conducts magnetic field lines. These ferromagnetic elements are embodied by conducting elements and optionally by fillers having ferromagnetic properties, which at least partly surround the magnet coil in the circumferential direction. This embodiment of the valve is suitable for all types of electromagnetically actuatable components.

22 Claims, 4 Drawing Sheets

ELECTROMAGNETICALLY ACTUATABLE VALVE

BACKGROUND OF THE INVENTION

The invention is based on an electromagnetically actuatable valve as defined hereinafter. In a known electromagnetically actuatable valve (U.S. Pat. No. 4,610,080) the magnet coil, for conducting the magnetic field lines, is surrounded by a metal valve housing made of ferromagnetic material. The result is not only high labor costs for manufacturing the metal valve housing, but also a large diameter and an undesirably high weight of the valve, since for static reasons the wall thickness of the valve housing is made thicker than required for conducting the magnetic field lines. Eddy currents ar also undesirably developed in the metal housing. The known valve also has a plastic intermediate part disposed between the valve housing and the valve seat body, which presents a possibility that thermal expansion or swelling of the plastic will cause this part to change its position, such that the valve needle will jam or the stroke of the valve needle, provided between the armature and the core, will undesirably change.

OBJECT AND SUMMARY OF THE INVENTION

The valve according to the invention has an advantage over the prior art in that the outer contour of the valve can easily and simply be adapted to requirements at an intended installation site of the valve. The valve can be manufactured simply and cost effectively with smaller circumferential dimensions in a manner that assures that operating safety requirements for the valve are met. The development of eddy currents at the circumference of the valve is also avoided.

A particularly advantageous feature is for a conducting element, made of ferromagnetic material, to be disposed as the ferromagnetic element in the plastic sheathing in such a way that it extends axially over the entire length of the magnet coil and partly surrounds the magnet coil in the circumferential direction. This requires particularly small dimensions of the valve and cost-effective manufacture is possible.

It is also advantageous to embody the conducting element with end sections that extend radially inward, or in cup-shaped fashion.

Another advantage, for improving flux transmission, is to provide, in addition to the at least one conductor element fillers of ferromagentic material in the plastic sheathing.

Another advantage is that at least one tubular metal intermediate part is disposed between one core end of the connection fitting, facing the armature, and the valve seat body. The intermediate part serves to guide the armature.

Another advantageous provision is to make the intermediate part of nonmagnetic material and to provide it with a guide bore for guiding the armature, and to dispose a connecting part, made of ferromagnetic material, tightly between the intermediate part and the valve seat body, with the armature protruding with play into this connecting part. As a result, a very slender and rigid connection between the connection fitting and the valve seat body can be attained.

Another advantageous feature is the tubular embodiment of both the armature and a connecting tube to the valve closing body, with walls as thin as possible, so that the masses to be moved by the electromagnetic field are as small as possible.

Still another advantage is that the intermediate part can be made of nonmagnetic sheet metal, such that it has a first connecting segment and a second connecting segment of larger diameter, both extending coaxially to the longitudinal valve axis. The first connecting segment is connected to the second by means of a collar extending radially outward. As a result, the intermediate part can easily by manufactured as a deep-drawn part. Also advantageously, the first connecting segment of the intermediate part is tightly joined to the core end of the connection fitting, and the second connecting segment is tightly joined to a tubular connecting part that rests with an end face against the collar and is made of ferromagnetic material and has a slide bore into which the armature protrudes and by which the armature is guided, while on the other end the valve seat body is joined to the connecting part.

A narrow annular stop collar is advantageously embodied on the core end of the connection fitting, facing the armature.

The invention will be better understood and further objects and advantages thereof will become more apparent from the ensuing detailed description of preferred embodiments taken in conjunction with the drawing.

DESCRIPTION OF THE PREFERRED EMBODIMENTS

Figure 1:
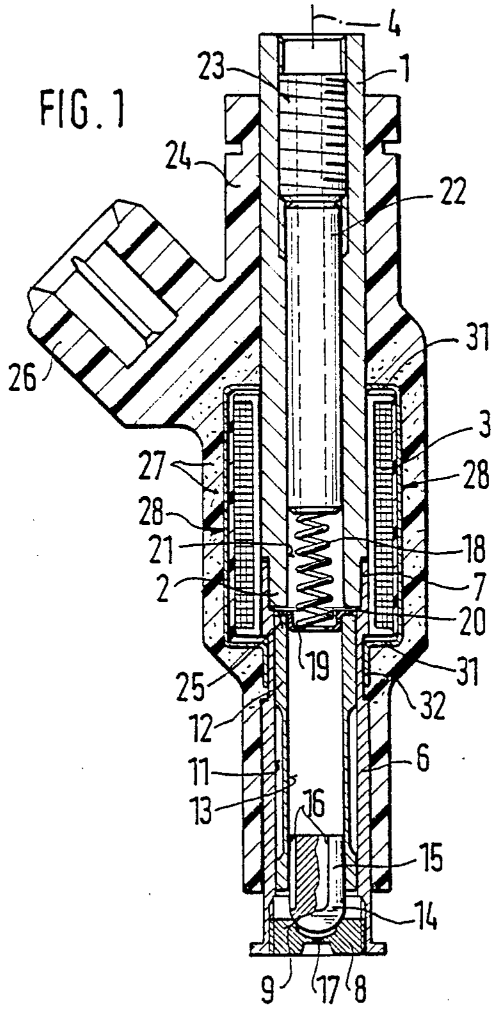
FIG. 1 shows a first exemplary embodiment of a valve equipped in accordance with the invention.

The electromagnetically actuatable valve shown in FIG. 1, shown in the form of an injection valve for fuel, forms a component of a fuel injection system of a mixture-compressing internal combustion engine with externally supplied ignition, and has a tubular metal connection fitting 1 of ferromagnetic material, on the core end 2 of which a magnet coil 3 is disposed. The connection fitting 1 thus simultaneously serves as the core. Adjoining the core end 2 of the connection fitting 1, concentrically with the longitudinal valve axis 4, an intermediate part 6 is tightly joined to the connection fitting 1 for instance by soldering or welding. The intermediate part 6 is made of nonmagnetic metal and includes a collar 7 which fits around the core end 2. Remote from the connection fitting 1, a metal valve seat body 8 is joined to the intermediate part 6 and has a fixed valve seat 9 toward the core end 2 of the connection fitting 1. The connection between the intermediate part 6 and the valve seat body 8 is likewise made tight; it can be effected by screwing, welding or soldering, for example. The alignment of the connection fitting 1, intermediate part 6 and valve seat body 8 with one another furnishes a rigid metal unit. The intermediate part 6 is tubular in embodiment and has a coaxial guide bore 11 into which an armature 12 extends. The armature is guided during its displacement movement by the guide bore and is tubular in embodiment. A valve closing body 14 is disposed in a inner bore 13 of the armature 12, on its end facing the valve seat 9, and is joined to the valve seat and may for instance take the form of a cylindrical segment 15 having a hemispherical end, or some other form which will form a good seat with the valve seat. Flattened areas 16 leading outward are provided on the circumference of the cylindrical segment 15; fuel flowing in from the upper end of the connection fitting 1 can flow past these flattened areas 16 on the inside of the armature 12, out of the inner bore 13 to the valve seat 9, downstream of which at least one injection port 17 is formed in the valve seat body 8.

Remote from the valve closing body 14, a restoring spring 18 protrudes into the inner bore 13 of the armature 12, being supported at one end for instance on a cup-shaped spring plate 19 in the inner bore 13. With a collar 20, the spring plate 19 rests on an armature end face 25 facing the core end 2 and in the excited state of the magnet coil 3 forms a remnant air gap between the core end 2 and the armature end face 25. The other end of the restoring spring 18 protrudes into a flow bore 21 of the connection fitting 1, where it rests on a tubular adjusting bushing 22, which is for instance supported on a screw bushing 23, screwed into the flow bore 21, for adjusting the spring tension. At least part of the connection fitting 1 and the magnet coil 3 over its entire length are surrounded by a plastic sheathing 24, which also surrounds at least part of the intermediate part 6. The plastic sheathing 24 can be made by compound filling or spray coating. An electric connection plug 26, by way of which the electrical connection of the magnet coil 3 and hence its excitation are effected, is formed onto the plastic sheathing 24 at the same time.

The magnet coil 3 is surrounded by at least one magnetic conducting element 28, serving as a ferromagnetic element, which is made of ferromagnetic material and extends in the axial direction over the entire length of the magnet coil 3 and at least partially surrounds the magnet coil 3 in the circumferential direction. In addition to the disposition of at least one conducting element 28, it may be useful for magnetically conductive fillers 27 likewise serving as ferromagnetic elements, to be incorporated into the plastic sheathing in the vicinity of the magnet coil 3. The ferromagnetic fillers 27 that conduct the magnetic field lines are shown in the drawing in the form of dots. As the fillers, parts made of metals having soft magnetic properties that are comminuted into fine particles are used. For better orientation of the fillers 27, it is useful to excite the magnet coil 3 during the phase of spray-coating or compound filling of the plastic sheathing 24, and/or during the setting phase of the sheathing.

Figure 2:
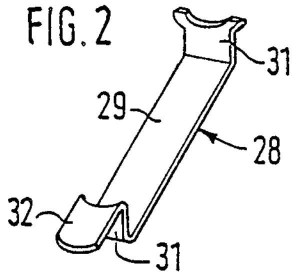
FIG. 2 shows a conducting element in a detailed view.

As shown in detail in FIG. 2, the conducting element 28 of FIG. 1 may be embodied in the form of a hoop, having a curved middle portion 29, adapted to the contour of the magnet coil, that only partly surrounds the magnet coil 3 in the circumferential direction and has end segments 31, extending radially inward, of which the upper end segment 31, for example, that partially surrounds the connection fitting 1 may be embodied as clawlike, while the lower end segment 31 merges with an axially extending shell end 32, which rests on the intermediate part 6 and partly surrounds it. A valve having two conducting elements 28 is shown in FIG. 1.

Figure 3:
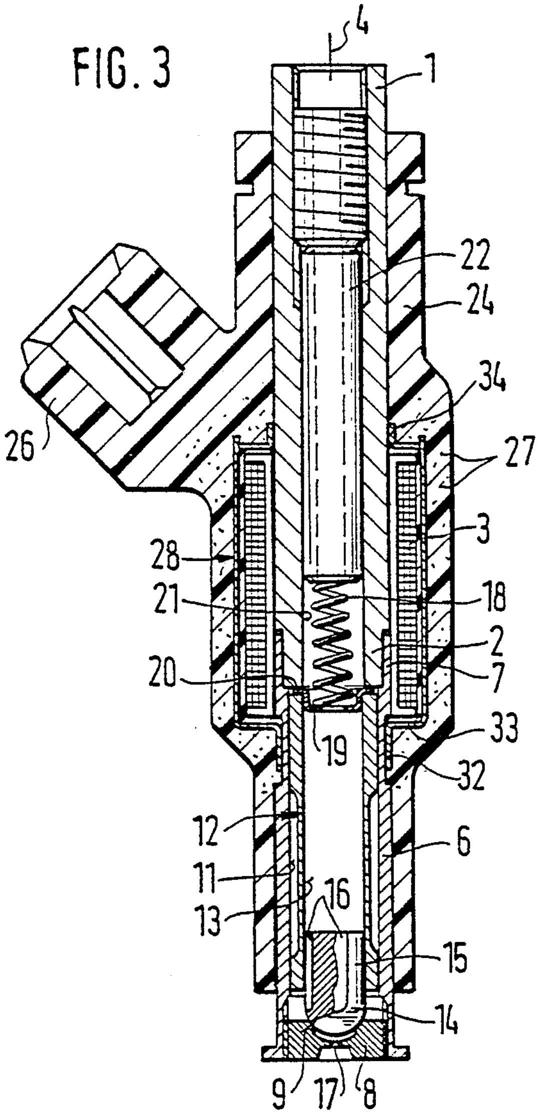
FIG. 3 shows a second exemplary embodiment of a valve equipped in accordance with the invention.

In the second exemplary embodiment of FIG. 3, elements the same as and functioning like those of the first exemplary embodiment of FIGS. 1 and 2 are identified by the same reference numerals. In contrast to the exemplary embodiment of FIG. 1, the conducting element 28 of the exemplary embodiment of FIG. 3 is cup-shaped in embodiment and extends radially inward with a bottom 33 that fits around the intermediate part 6. A cap-shaped conducting disk 34 of ferromagnetic material for conducting the magnetic field lines can extend radially between the connection fitting 1 and the open end of the cup-shaped conducting element 28.

Figure 4:
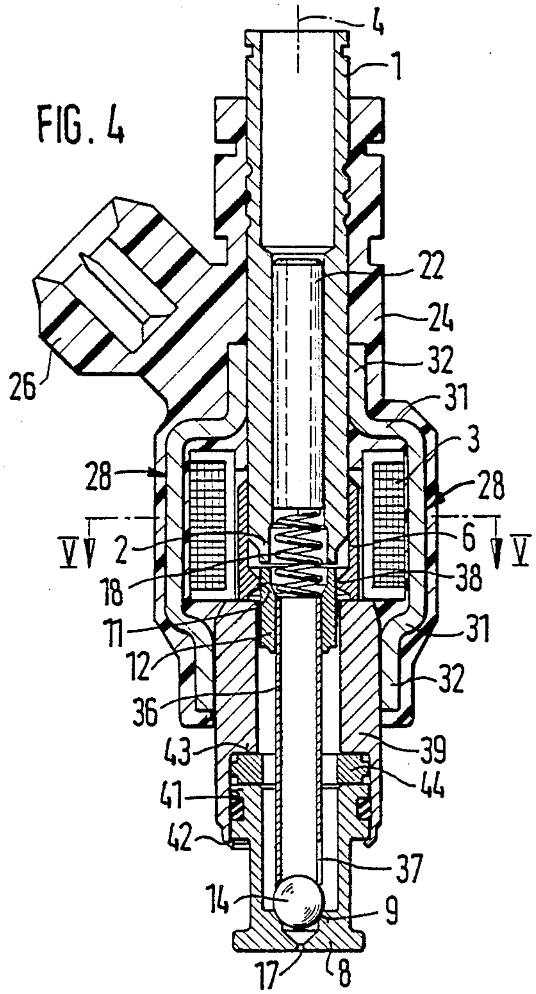
FIG. 4 shows a third exemplary embodiment of a valve equipped in accordance with the invention.
Figure 5:
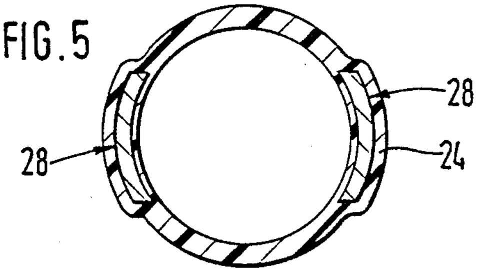
FIG. 5 is a section taken along the line V—V of FIG. 4.

In the third exemplary embodiment of FIG. 4, elements that remain the same as and function like those of the above embodiments are identified by the same reference numerals. Once again, as in the above embodiments, the magnet coil 3 is surrounded by a plastic sheathing 24, in which at least one conducting element 28 is embedded such that it fits over the magnet coil 3 in the axial and radial directions and has end segments 31 or shell ends 32 on each end, that serve to guide the magnetic field lines around the magnet coil 3. In contrast to the above embodiments, although the armature 12 is still tubular, it is shorter and is connected to a connecting tube 36, which is connected at its other end to the valve closing body 14 embodied as a ball. Through flow openings 37 of the connecting tube 36 that are provided in the wall, radially penetrating it, the fuel flowing in from the interior of the armature 12 can reach the valve seat 9. The intermediate part 6, which is likewise nonmagnetic and is connected to the connection fitting 1, has a radially inwardly extending guide collar 38 with a very short guide bore 11 for guiding the armature 12. A connecting part 39, likewise tubular and made of ferromagentic metal, is tightly connected to the intermediate part 6, and the armature 12 protrudes partway, with play, into this part 39, so that the magnetic field lines close i.e. make a closed circuit toward the armature via the conducting element 28, the end segment 31 and the lower shell end 32 resting on the connecting part 39. The valve seat body 8 is inserted into a retaining bore 41 of the connecting part 39 that is coaxial with the longitudinal valve axis 4 and is retained in this bore by a encompassing crimped rim 42 of the connecting part 39. The required stroke of the valve closing element 14 can be adjusted by means of a shim ring 44 also placed in the retaining bore 41 in the axial direction between the valve seat body 8 and a bore bottom 43 of the connecting part 39. In the exemplary embodiment of FIG. 4, two conducting elements 28 are provided, which may be disposed facing one another as shown in FIG. 5. An identical arrangement is also useful for the embodiment of FIG. 1. For reasons of space, it is also possible to have the electric connection plug 26 extend in a plane that is rotated by 90°, or in other words is vertically on a plane through the guide elements 28. In addition to the conducting elements 28, the exemplary embodiment of FIG. 4 may likewise have ferromagnetic fillers in the plastic sheathing 24, in the vicinity of the magnet coil 3. The elements comprising the connecting fitting 1, intermediate part 6, connecting part 39 and valve seat body 8 form a unit of metal parts rigidly coupled with one another.

Figure 6:
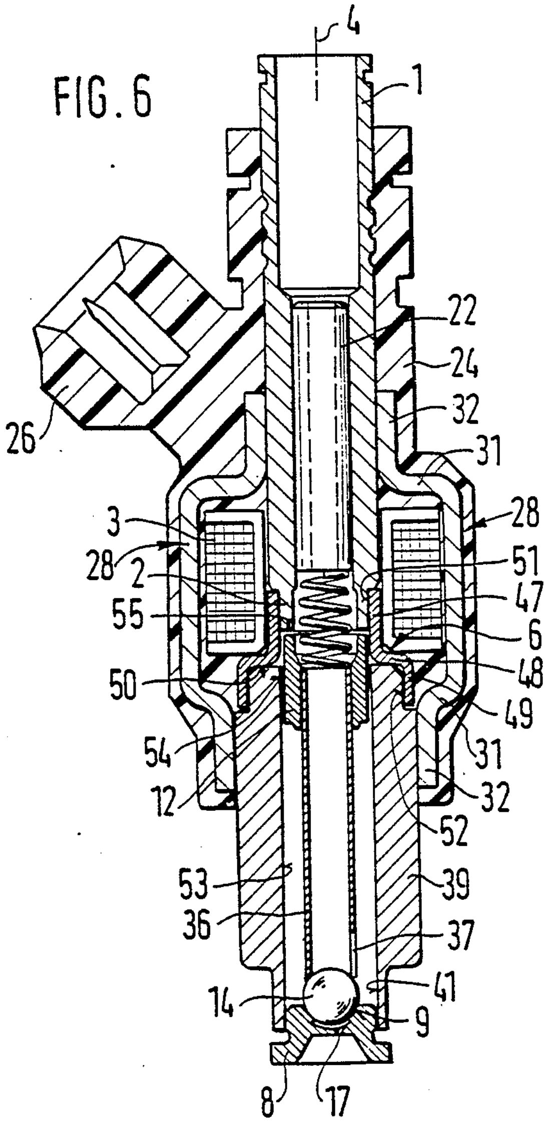
FIG. 6 shows a fourth exemplary embodiment of a valve equipped in accordance with the invention.

In the fourth exemplary embodiment of FIG. 6, elements remaining the same as and functioning like those of previous embodiments are again identified by the same reference numerals. As explained in detail in conjunction with the embodiment of FIG. 4, conducting elements 28 in the form of hoops are likewise embedded in the plastic sheathing 24 and serve to guide the magnetic field lines around the magnet coil 3. Differing substantially from the exemplary embodiment of FIG. 4, the intermediate part 6 in the valve of FIG. 6 is made of nonmagnetic deep-drawn sheet metal, which extending coaxially to the longitudinal valve axis 4 has a first connecting segment 47, with which it fits completely around the core end 2 and is tightly joined to it, for instance by soldering or welding. A collar 48 extending radially outward from the first connecting segment leads to a second connecting segment 49 of the intermediate part 6, which extends coaxially with the longitudinal valve axis 4 and protrudes partway beyond in the direction of the connecting part 39, with which it is tightly joined, for instance by soldering or welding. Thus the diameter of the second connecting segment 49 is greater than the diameter of the first connecting segment 47, so that in the installed state, the tubular connecting part 39 rests with an end face 50 on the collar 48. To make small external dimensions of the valve possible, the first connecting segment 47 fits around a retaining step 51 of the core end 2, which step has a smaller diameter than the connection fitting 1, and the second connecting segment 49 fits over a retaining step 52 of the connecting part 39, and this step 52 likewise has a diameter smaller than that of the region adjoining it.

Remote from the end face 50, the connecting part 39, made of ferromagnetic material, has the retaining bore 41, into which the valve seat body 8 is tightly inserted. The retaining bore 41 merges with a transition bore 53, which is adjoined in the vicinity of the end face 50 by a slide bore 54, into which the armature 12 protrudes and by which the armature 12 is guided. The retaining bore 41 and the slide bore 54 can thus be produced in the same chuck during manufacture, producing bores that are very accurately aligned with one another. In this exemplary embodiment, the armature 12 is guided by neither the intermediate part 6 no the transition bore 53 of the connecting part 39. The axial extent of the slide bore 54 is small in comparison with the axial length of the armature 12, being about 1/15 the length of the armature 12. A narrow annular stop collar 55, the width of which is approximately 0.2 mm, is formed on the core end of the connection fitting 1, facing the armature 12.

Embodying the conducting elements 28 so that they do no completely surround the circumference of the magnet coil 3, in accordance with FIGS. 1, 2, 4, 5 and 6, also has the effect of preventing eddy currents from arising at the circumference of the valve.

The plastic sheathing having conducting elements as described makes a compact, slender valve construction possible in all the exemplary embodiments, thus enabling simple and cost-effective manufacture.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. An electromagnetically actuatable valve for fuel injection systems of internal combustion engines, having a ferromagnetic metal connection fitting (1) which serves as a core having a core end (2) and which extends along a longitudinal valve axis, a valve seat body (8) including a fixed valve seat (9), a magnet coil (3) disposed about a portion of said core end (2) of said connection fitting, an armature (12) operable by said magnet coil and said core, a valve closing body (14) disposed on said armature, said valve closing body cooperating with said fixed valve seat, at least one tubular, non-magnetic sheet metal intermediate part (6) connected to said core end (2) of the connecting fitting (1) facing the armature (12) which extends toward said valve seat body (8), a plastic sheathing (24) surrounding a portion of said connection fitting, said plastic sheathing (24) likewise surrounds said magnet coil (3), and ferromagnetic, conducting elements that conduct magnetic field lines are provided at least in a part of said plastic sheathing (24) which surrounds at least a portion of said magnet coil (3), and at least one magnetic conducting ferromagnetic element (28) disposed in said plastic sheathing (24) such that said ferromagnetic element extends in an axial direction over the entire length of said magnet coil (3) and at least partly surrounds said magnetic coil (3) in a circumferential direction.

2. A valve as defined by claim 1, in which said intermediate part (6) is coaxial with the longitudinal valve axis of said valve, said intermediate part includes a first connecting segment (47) and a second connecting segment (49) of larger diameter, said first connecting segment (47) is connected by a radially outwardly extending collar (48) to said second connecting segment (49).

3. A valve as defined by claim 2, in which said first connecting segment (47) of the intermediate part (6) is tightly connected to said core end (2) of the connection fitting (1), and said second connecting segment (49) is tightly connected to a tubular connecting part (39), which rests with an end face (50) on said collar (48).

4. A valve as defined by claim 3, in which said tubular connecting part (39) is made of ferromagnetic material and is connected, remote from said end face (50) of said intermediate part (6), with said valve seat body (8), and includes a slide bore (54), into which said armature (12) protrudes, and by which said armature (12) is guided.

5. A valve as defined by claim 4, which includes a connecting tube (36) connected to said armature (12) and said valve closing body (14), embodied as a ball, is secured to said connecting tube (36).

6. A valve as defined by claim 5, which includes a narrow, annular stop collar (55) embodied on said core end (2) of said connection fitting (1) facing said armature (12).

7. An electromagnetically actuatable valve for fuel injection systems of internal combustion engines, having a ferromagnetic metal connection fitting (1) which serves as a core having a core end (2) and which extends along a longitudinal valve axis, a valve seat body (8) including a fixed valve seat (9), a magnet coil (3) disposed about a portion of said core end (2) of said connection fitting, an armature (12) operable by said magnet coil and said core, a valve closing body (14) disposed on said armature, said valve closing body cooperating with said fixed valve seat, at least one tubular, metal, non-magnetic material, intermediate part (6) connected to said core end (2) of the connecting fitting (1) facing the armature (12) which extends toward said valve seat body (8) and has a guide bore (11) for guiding said armature (12), a plastic sheathing (24) surrounding a portion of said connection fitting, said plastic sheathing (24) likewise surrounds said magnet coil (3), and ferromagnetic, conducting elements that conduct magnetic field lines are provided at least in a part of said plastic sheathing (24) which surrounds at least a portion of said magnet coil (3), and at least one magnetic conducting ferromagnetic element (28) disposed in said plastic sheathing (24) such that said ferromagnetic element extends in an axial direction over the entire length of said magnet coil (3) and at least partly surrounds said magnetic coil (3) in a circumferential direction.

8. A valve as defined by claim 7, which includes fillers (27) having ferromagnetic properties incorporated into the plastic sheathing (24) which serves as additional ferromagnetic conducting elements.

9. A valve as defined by claim 7, in which said ferromagnetic conducting element (28) has end segments extending radially inward above and below said magnet coil.

10. A valve as defined by claim 9, in which said ferromagnetic conducting element (28) is cup-shaped in embodiment.

11. A valve as defined by claim 7, in which said valve seat body is connected to one end of said intermediate part (6).

12. A valve as defined by claim 11, in which said armature (12) is tubularly and is connected with said valve closing body (14) facing the valve seat (9).

13. A valve as defined by claim 7, which includes a tubular connecting part (39), made of ferromagnetic material into which said armature (12) protrudes partway with play, said tubular connecting part is tightly disposed between said intermediate part (6) and said valve seat body (8).

14. A valve as defined by claim 13, which includes a connecting tube (36) connected to said armature (12), and said valve closing body (14), embodied as a ball, is secured to said connecting tube (36).

15. A valve as defined by claim 7, which includes a connecting tube (36) connected to said armature (12), and said valve closing body (14), embodied as a ball, is secured to said connecting tube (36).

16. An electromagnetically actuatable valve for fuel injection systems of internal combustion engines, having a ferromagnetic metal connection fitting (1) which serves as a core having a core end (2) and which extends along a longitudinal valve axis, a valve seat body (8) including a fixed valve seat (9), a magnet coil (3) disposed about a portion of said core end (2) of said connection fitting, an armature (12) operable by said magnet coil and said core, a valve closing body (14) disposed on said armature, said valve closing body cooperating with said fixed valve seat, at least one non-magnetic material intermediate part (6) connected to said core end (2) of the connecting fitting (1) facing the armature (12) which extends toward said valve seat body (8), a plastic sheathing (24) surrounding a portion of said connection fitting, said plastic sheathing (24) likewise surrounds said magnet coil (3), and ferromagnetic, conducting elements that conduct magnetic field lines are provided at least in a part of said plastic sheathing (24) which surrounds at least a portion of said magnet coil (3), and at least one magnetic conducting ferromagnetic element (28) disposed in said plastic sheathing (24) such that said ferromagnetic element extends in an axial direction over the entire length of said magnet coil (3) and at least partly surrounds said magnetic coil (3) in a circumferential direction.

17. A valve as defined by claim 16, in which said valve seat body is connected to one end of said intermediate part (6).

18. A valve as defined by claim 16, which includes a tubular connecting part (39), made of ferromagnetic material into which said armature (12) protrudes partway with play, said tubular connecting part is tightly disposed between said intermediate part (6) and said valve seat body (8).

19. A valve as defined by claim 16, which includes a connecting tube (36) connected to said armature (12), and said valve closing body (14), embodied as a ball, is secured to said connecting tube (36).

20. A valve as defined by claim 16, in which said ferromagnetic conducting element (28) has end segments extending radially inward above and below said magnet coil.

21. A valve as defined by claim 16, in which said ferromagnetic conducting element (28) is cup-shaped in embodiment.

22. A valve as defined by claim 16, which includes fillers (27) having ferromagnetic properties incorporated into the plastic sheathing (24) which serves as additional ferromagnetic conducting elements.

* * * * *